United States Patent
Bonnaud et al.

(10) Patent No.: US 8,186,619 B2
(45) Date of Patent: May 29, 2012

(54) AIRPLANE ENGINE PYLON COMPRISING AT LEAST ONE PROTRUDING ELEMENT TO GENERATE A VORTEX OF THE AIRFLOW

(75) Inventors: Cyril Bonnaud, Toulouse (FR); Stephanie Dantin, Leguevin (FR); Marjorie Defos, Toulouse (FR); Thierry Fol, Grenade (FR)

(73) Assignee: Airbus Operations SAS, Toulouse (FR)

( * ) Notice: Subject to any disclaimer, the term of this patent is extended or adjusted under 35 U.S.C. 154(b) by 356 days.

(21) Appl. No.: 12/403,429

(22) Filed: Mar. 13, 2009

(65) Prior Publication Data

US 2009/0230251 A1 Sep. 17, 2009

(30) Foreign Application Priority Data

Mar. 14, 2008 (FR) ...................................... 08 51670

(51) Int. Cl.
B64C 23/06 (2006.01)
(52) U.S. Cl. ...................................... 244/54; 244/199.1
(58) Field of Classification Search .................. 244/200, 244/200.1, 198, 199.1, 54, 199.2, 199.4
See application file for complete search history.

(56) References Cited

U.S. PATENT DOCUMENTS

| | | | |
|---|---|---|---|
| 3,744,745 A | 7/1973 | Kerker et al. | |
| 4,314,681 A * | 2/1982 | Kutney | 244/54 |
| 4,466,587 A * | 8/1984 | Dusa et al. | 244/121 |
| 4,477,040 A * | 10/1984 | Karanik | 244/58 |
| 4,489,905 A * | 12/1984 | Bengelink et al. | 244/130 |
| 4,643,376 A | 2/1987 | Vanderhoeven | |
| 6,364,254 B1 * | 4/2002 | May | 244/214 |
| 7,070,144 B1 * | 7/2006 | DiCocco et al. | 244/3.21 |
| 7,334,760 B1 * | 2/2008 | Lisy et al. | 244/203 |
| 7,866,608 B2 * | 1/2011 | Atinault | 244/199.1 |
| 2004/0046086 A1 * | 3/2004 | Dixon et al. | 244/199 |
| 2006/0060707 A1 * | 3/2006 | Chow et al. | 244/129.4 |
| 2008/0067292 A1 * | 3/2008 | Bonnaud et al. | 244/199.1 |

FOREIGN PATENT DOCUMENTS

FR 2 555 960 A 6/1985
FR 2 899 201 A 10/2007

* cited by examiner

*Primary Examiner* — Robert Canfield
*Assistant Examiner* — Jessie Fonseca
(74) *Attorney, Agent, or Firm* — Perman & Green, LLP

(57) ABSTRACT

A wing arrangement of an aircraft has a wing and at least one pylon for suspending an engine below the wing. The wing has a leading edge with a high-lift device, which is able to move between a deployed position in which the high-lift device projects forward of the leading edge, and which is interrupted in a forward intermediate region of the wing located at the leading edge, the pylon having a forward edge extending forward of the leading edge of the wing between a forward upper portion connected to the wing in the forward intermediate region and a forward lower portion connected to a nacelle of the engine. An element of narrow elongate shape protrudes longitudinally from the forward edge and, during flight at a high angle of attack of the aircraft, generates a vortex of aerodynamic flow that is propagated toward the forward intermediate region above the wing.

8 Claims, 3 Drawing Sheets

AIRPLANE ENGINE PYLON COMPRISING AT LEAST ONE PROTRUDING ELEMENT TO GENERATE A VORTEX OF THE AIRFLOW

CROSS-REFERENCE TO RELATED APPLICATIONS

This application claims priority to French Application No 08 51670, filed on 14 Mar. 2008, the disclosure of which is incorporated herein by reference in its entirety.

BACKGROUND

1. Field

The disclosed embodiments relate to an aircraft wing arrangement of the type comprising a wing and also at least one pylon for suspending an engine below this same wing.

More specifically, the disclosed embodiments relate to a wing arrangement for an aircraft whose wings have high-lift devices which are interrupted at the interface between the wing and a pylon, resulting in a reduction of the lift capabilities of the wing during flight at a high angle of attack.

2. Brief Description of Related Developments

In modern aircraft, more specifically civilian transport aircraft, it is known practice to suspend the engines below the wing structure using suspension pylons.

Such pylons are working structures which transmit the forces generated by the engines to the structure of the aircraft and additionally serve to route fuel systems, electrical systems, hydraulic systems and air systems between the engine and the aircraft.

The position of the engines in relation to the wing is the result of a compromise. For aerodynamic reasons, the engines are preferably placed so as to maximize the distance between the engine and the wing.

For reasons of engine ground clearance when the aircraft is on the ground, it is not possible, however, for the engines to be placed much below the wing structure. Given the various installation constraints, it is common for the engines to be positioned below the wing and essentially forward of the leading edge of the wing in the continuation of the local chord of the wing, at which local chord the pylon is fastened.

Moreover, the wings of the aircraft are generally provided with a high-lift device, for example comprising slats, which is situated in particular at the leading edge of said wings.

This high-lift device, arranged at the leading edge over most of the span, is able to move between:
- a retracted position in which the nominal profile of the wing in cruise mode is ensured, and
- at least one deployed position in which said high-lift device is deployed forward of the aircraft and downward.

The deployed position is most particularly used in reduced-speed flight phases, when the angle of attack of the aircraft is high in order to reduce the flight speed, for the purpose of increasing the lift coefficients of the wings.

On account of the pylons which hold the engines in place, it is necessary to interrupt the high-lift device at the pylon in order to avoid mechanical interference with said pylon, in particular in the case of swept wings.

This interruption in the high-lift device introduces a discontinuity in the leading edge when said device is in the deployed position, this being the source of aerodynamic flow disturbances. The interruption in the high-lift device in the region of the pylon is a cause of premature airflow separations on the suction side of the wing, these separations degrading the aerodynamic performance of the aircraft and, in particular, the maximum value of the lift coefficient of the wing.

In order to reduce the negative effects associated with interrupting the high-lift device on the leading edge of the wing structure, it is known from patent FR 2555960 to use a bent pylon which, in the region of the leading edge, is locally perpendicular to said leading edge. The high-lift device, which for reasons of mechanical installation likewise moves perpendicularly to the leading edge when it is deployed, can then be adjusted to reduce the spacing between said deployed device and the pylon so as to limit the discontinuity in the leading edge.

This solution has the disadvantage of requiring a pylon of complex geometry whose shape is not compatible with a maximum reduction of drag in cruise mode.

It is also known from U.S. Pat. No. 3,744,745 to position vanes on the nacelles of the engines, these vanes, when at an angle of attack, generating vortices which propagate over the suction side of the wing in the interrupted region of the high-lift device and delay the occurrence of aerodynamic separations.

This solution has the disadvantage of introducing a drag penalty when the aircraft is in cruise mode. Furthermore, given their dimensions, it may prove a difficult operation to install the vanes on account of the movable elements of the nacelle and the need for precise aerodynamic positioning.

Moreover, the vanes may introduce constraints in the conditions of interchangeability of an engine, with its nacelle, when the engine can be fitted on various models of aircraft including some without vanes or with different vanes.

SUMMARY

To solve the aforementioned problems, the disclosed embodiments provide a wing arrangement in which a pylon particularly has an element for generating, during flight at a high angle of attack, vortices which propagate longitudinally from a forward edge of said pylon toward the suction side of the wing in the region where the high-lift device is interrupted.

The disclosed embodiments relate to a wing arrangement of an aircraft, comprising a wing and at least one pylon for suspending an engine below the wing, said wing having a leading edge provided with a high-lift device which is able to move between at least two positions, one being a deployed position in which the high-lift device projects forward of the leading edge in order to increase a lift coefficient of the wing during flight at a high angle of attack, and is interrupted in a forward intermediate region of the wing that is situated at the leading edge.

The pylon has a forward edge extending substantially forward of the leading edge of the wing between a forward upper portion connected to the wing in the forward intermediate region and a forward lower portion connected to a nacelle of the engine. To reduce aerodynamic disturbances associated with the interruption of the high-lift device, the pylon has, on the forward edge, a protruding element of narrow elongate shape that is oriented substantially in a longitudinal direction of the forward edge, such that during flight at a high angle of attack of the aircraft, the protruding element generates at least one vortex of the aerodynamic flow that is propagated toward the forward intermediate region above the wing.

In order to have a drag generated by the protruding element that is negligible at cruise angles of attack, said protruding element is preferably arranged at the surface of the forward edge substantially along a line which corresponds to the separation of the aerodynamic flow during flight at a low angle of attack of the aircraft.

To promote the generation of the at least one vortex of the aerodynamic flow during flight at a high angle of attack, the protruding element has a free upper edge, this edge either being of rounded shape in a transverse plane or having at least one arris substantially in the longitudinal direction.

The protruding element is advantageously an add-on part attached to fairing panels forming the forward edge of the pylon, and has a lower base fastened, for example by riveting, to the forward edge of said pylon. In another embodiment, the protruding element is obtained by deformation of fairing panels of the forward edge of the pylon.

The protruding element is elongated between an aft end of the pylon in the vicinity of the forward upper portion and a forward end of the pylon. The element is either continuous or discontinuous and formed by a plurality of sub-elements which are aligned substantially in the longitudinal direction.

The disclosed embodiments also relate to an aircraft comprising at least one wing arrangement according to the aspects of the disclosed embodiments.

BRIEF DESCRIPTION OF THE DRAWINGS

The description which follows of the aspects of the disclosed embodiments is given with reference to the figures, in which and with no limitation being implied.

DETAILED DESCRIPTION OF THE DISCLOSED EMBODIMENTS

Figure 1:
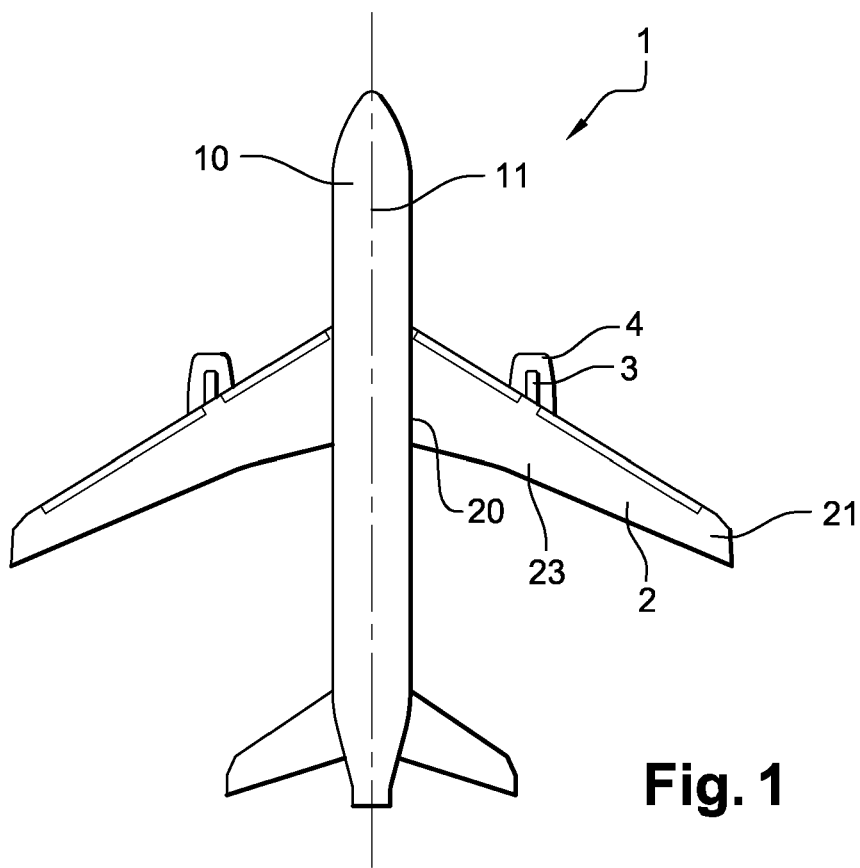
FIG. 1 shows a schematic plan view of an aircraft having engines fastened below the wings by pylons.

The disclosed embodiments find an application in aircraft having wing arrangements of the type comprising engines suspended below the wings by suspension pylons. FIG. 1 shows an aircraft 1 of this type as seen from above.

The aircraft 1 has a fuselage 10 defining a longitudinal axis 11 which is oriented substantially in a direction of travel of said aircraft.

In the remainder of the description, any reference to forward direction is to be considered along the longitudinal axis 11 as corresponding to the direction of normal travel of the aircraft 1 in flight. Any reference to aft direction corresponds to the opposite direction along the longitudinal axis 11.

The aircraft 1 is provided, laterally with respect to the fuselage 10, with a wing arrangement comprising a wing 2 below which at least one engine 4 is fastened by way of a suspension pylon 3.

The wing 2 has a root 20 on the fuselage 10 side and a free end 21 on the opposite side to said root. The wing 2 also has a lower surface, termed pressure side 22, and an upper surface, termed suction side 23.

Figure 2:
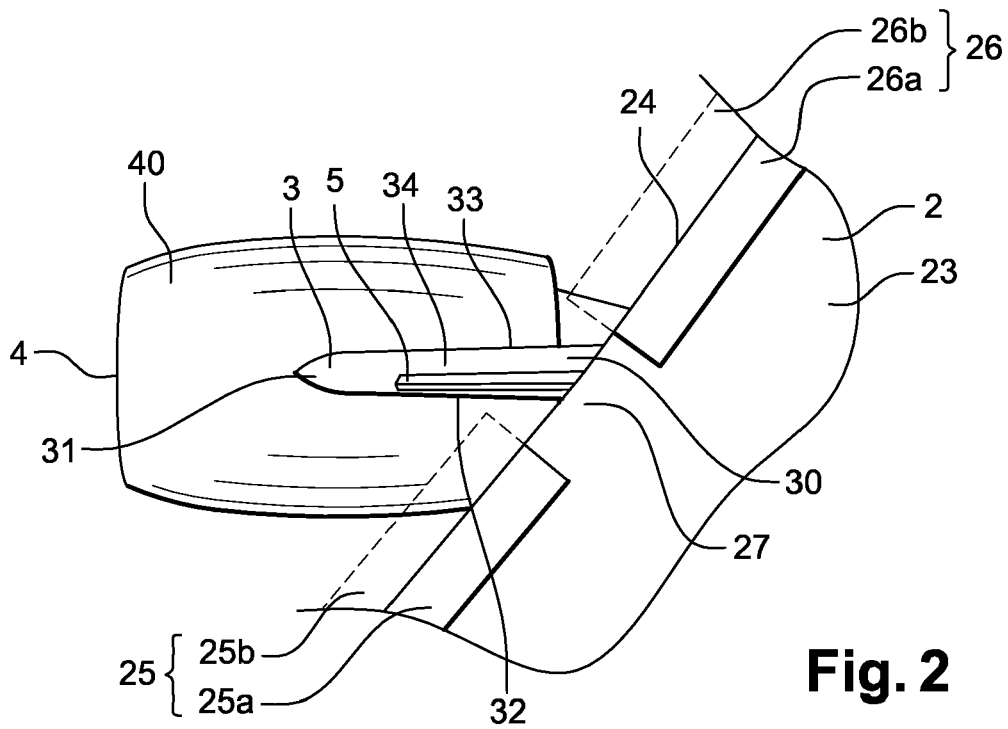
FIG. 2 shows a partial schematic plan view of the aircraft shown in FIG. 1 in a region of a pylon.

In its forward portion, termed leading edge 24, the wing 2 has a high-lift device comprising movable elements, for example slot-forming slats or Krueger slats. In the remainder of the description, and with no limitation being implied, a high-lift device will be considered which comprises two slats extending along the span of the wing on each side of the pylon 3, with a first slat 25 on the root 20 side of said wing and a second slat 26 on the free end 21 side, these slats being visible in FIGS. 2, 3 and 4.

Each slat 25, 26 is able to move between at least two end positions:

a retracted position, 25a and 26a respectively, in which, under cruise conditions, the slats provide the geometric continuity of the profiles of the wing in the region of the leading edge 24, and a deployed position, 25b and 26b respectively (depicted by broken lines in FIG. 2), in which said slats project forward of the leading edge 24 with a movement which is substantially perpendicular to said leading edge.

Where appropriate, the slats 25 and 26 have one or more intermediate positions between the retracted position and the totally deployed position.

The retracted position 25a, 26a is used during cruise flight, in which the aircraft is at a low angle of attack owing to the cruise speed and the dynamic pressure.

The deployed position 25b, 26b is essentially used to increase the maximum value of the lift coefficient of the wing structure during flight at a reduced speed, for example in takeoff, landing or approach phases, in which the aircraft is at a high angle of attack.

A forward intermediate region 27 is defined between the two slats 25 and 26 and corresponds to that portion of the wing 2 in which the pylon 3 is fastened, on the pressure side 22 of said wing.

The engine 4, for example a turbofan, is integrated into a nacelle 40.

The pylon 3 has a forward upper portion 30 which is connected to the wing 2 at the pressure side 22 in the forward intermediate region 27 of the wing 2, and a forward lower portion 31 which is connected to the nacelle 40 of the engine 4. The pylon 3 also has an inboard lateral flank 32 which faces the fuselage 10 of the aircraft 1, and an outboard lateral flank 33 on the opposite side to the inboard lateral flank. A forward edge 34 is situated between said inboard and outboard lateral surfaces, at the front of the pylon 3.

The forward edge 34 extends, between the forward upper portion 30 and the forward lower portion 31, forward of the leading edge 24 of the forward intermediate region 27, substantially in the continuation of the local chord, at which local chord the pylon 3 is fastened, and downward.

The forward edge 34 is generally produced with rounded shapes in order to form a leading edge of the pylon 3 that is profiled so as to optimize the aerodynamic drag associated with the presence of the engine 4 and the pylon 3 below the wing structure.

The two slats 25 and 26 are mechanically designed inter alia in such a way that they do not interfere geometrically with the structure of the pylon 3 when they are in the deployed position, 25b and 26b respectively. Thus, on account of the interruption of the high-lift device at the forward intermediate region 27 of the leading edge 24, said leading edge has a discontinuity when the aircraft 1 is flying with said high-lift device in the deployed position. By contrast with a situation in which use is made of a high-lift device without discontinuity, this discontinuity leads to modifications in the distributions of pressure over the surfaces of the wing, in particular over the suction side of the wing, which are the source of premature separations of the aerodynamic flow, and hence reduce the maximum value of the lift coefficient of the wing 2.

Figure 3:
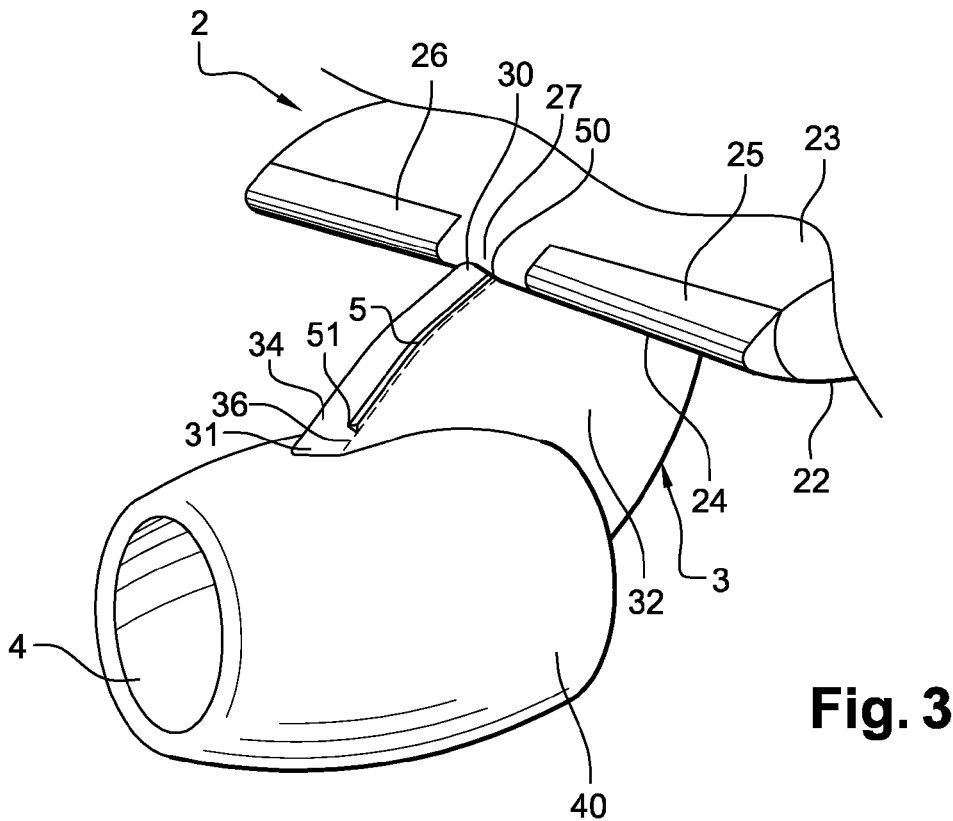
FIG. 3 shows a partial schematic perspective view of an aircraft in the region of a pylon according to a first embodiment.

To solve this problem, the pylon 3 is provided on the forward edge 34 with an element 5, represented in FIGS. 3 and 4, which protrudes forwardly substantially orthogonally to the outer surface of the forward edge 34.

The element 5 has a narrow elongate shape and extends substantially in a longitudinal direction over the forward edge 34 of the pylon 3.

By "longitudinal direction" is meant that said element extends between an aft end 50 and a forward end 51, where the aft and forward directions are taken with respect to the longitudinal axis 11 of the aircraft 1. The element 5 is arranged along the outer surface of the forward edge 34, which surface is generally inclined with respect to said longitudinal axis owing to the fact that said forward edge 34 extends forward of the leading edge 24 but also downward.

The aft end 50 is preferably in the vicinity of the forward upper portion 30 of the forward edge 34 of the pylon 3. The forward end 51 is, for example, situated between the forward upper portion 30 and the forward lower portion 31 of the pylon 3, as represented in FIG. 3, or in the vicinity of the forward lower portion 31 of the suspension pylon 3.

FIG. 3 represents an embodiment of the pylon 3 in which said pylon comprises a continuous element 5.

Figure 4:
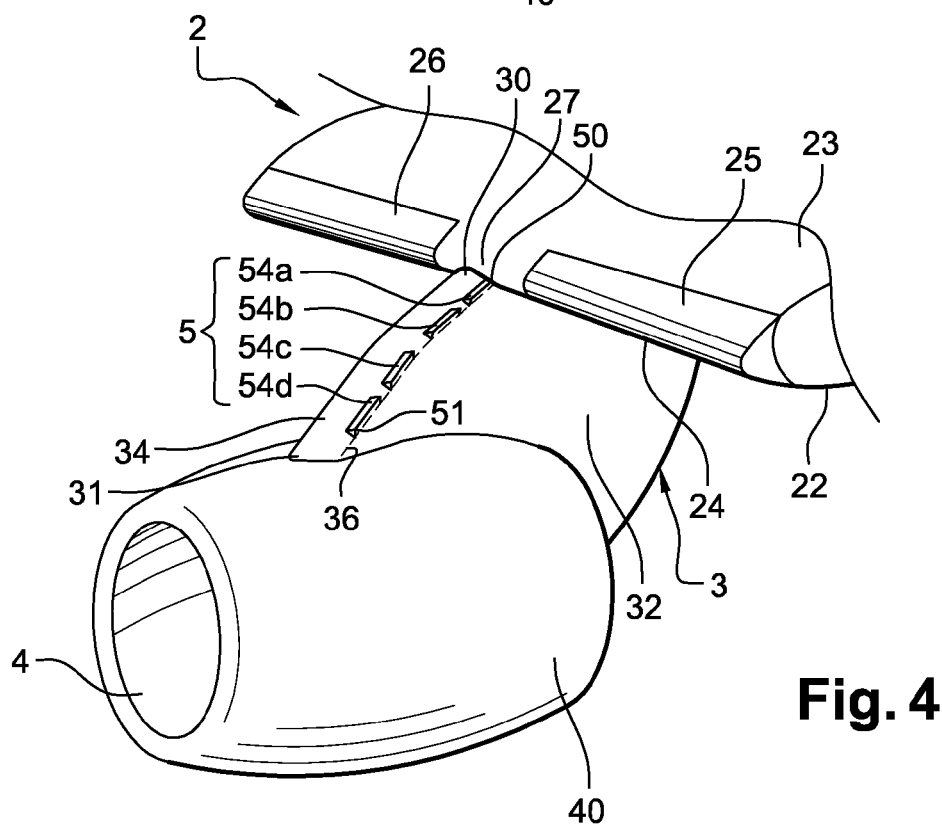
FIG. 4 shows a partial schematic perspective view of an aircraft in the region of a pylon according to a second embodiment.

FIG. 4 represents a similar embodiment in which the element 5 is formed by a plurality of sub-elements 54a, 54b, 54c and 54d. Each sub-element 54a, 54b, 54c, 54d has a narrow shape which is elongated substantially longitudinally, and said sub-elements are aligned longitudinally between the aft end 50 and the forward end 51, forming a discontinuous element 5 between said aft and forward ends.

When the aircraft 1 is flying at a high angle of attack, that is to say during low-speed flight phases, a local nonlongitudinal flow is progressively established as the angle of attack increases.

Owing to its angle of attack with respect to the local nonlongitudinal flow, the element 5 leads to the formation of vortices which are attached thereto. On account of the forward and upper position of said element on the forward edge 34, vortices are propagated toward the forward intermediate region 27, on the suction side 23 of the wing 2, at least for a sufficient value of the angle of attack.

In a known manner, the vortices modify the behavior of the boundary layer through an energy input. This input has the effect of delaying the aerodynamic separations on the suction side of the wing structure in the region disturbed by the interruption of the high-lift device.

The length of the element 5, considered between the aft end 50 and the forward end 51, the height of said element, considered orthogonally to the surface of the forward edge 34, and the width of said element, considered transversely, are determined by simulation, theory or experimentation in order to promote the formation of vortices having sufficient intensities during flight at a high angle of attack, taking account of the risks of separations on the suction side of the wing 2. The risks of separations are associated with the shape of the profile of the wing 2, with the configuration of the high-lift device, that is to say the slats 25 and 26, and with the configurations of the nacelle 40 and the pylon 3.

The height of the element 5 is, for example, between 1 centimeter and 10 centimeters.

The length of the element 5 is dependent on the dimensions of the pylon 3 in question and is preferably between a few tens of centimeters and 1 meter or more.

In the case of the discontinuous element 5 shown in FIG. 4, the length of each sub-element 54a, 54b, 54c, 54d is preferably between a few centimeters and a few tens of centimeters, and the spacing between two sub-elements is preferably between 1 centimeter and a few tens of centimeters.

The width of the element 5 is preferably between a few millimeters and a few centimeters, and is advantageously substantially constant along the length of the element 5 (or of each sub-element 54a, 54b, 54c, 54d if said element is discontinuous).

In a preferred embodiment of the pylon 3, the element 5 generating the air vortices is likewise arranged, on the forward edge 34 of said pylon, substantially along a line 36 which, prior to positioning said element, corresponds to the separation of the aerodynamic flow during flight at a low angle of attack.

The aerodynamic flow separation line 36, represented in broken lines in FIGS. 3 and 4, corresponds to a virtual line on the forward edge 34 which separates the region in which the stream lines of the aerodynamic flow propagate on the inboard lateral flank 32 side from the region in which the stream lines of the aerodynamic flow propagate on the outboard lateral flank 33 side when the aircraft 1 is flying at a low angle of attack, in particular at cruising speed.

The aerodynamic flow separation line 36 is determined by simulation and theory at a design stage of the pylon 3 and the aircraft 1, or by experimentation at a subsequent development stage of said aircraft, in particular during test flights.

Owing to the arrangement of the element 5 along the separation line 36, the aerodynamic disturbances generated are low and the corresponding drag is negligible at cruise angles of attack. The aerodynamic loads, to which the element 5 is exposed, are essentially associated with the local nonlongitudinal flow during flight at a high angle of attack and are therefore limited, on the one hand, because of the reduced dynamic pressure during these flight conditions and, on the other hand, because of the reduced dimensions of the element 5.

In a particularly advantageous embodiment, the element 5 is simply fastened to fairing panels of the pylon 3 which form the forward edge 34. The element 5 is, for example, a profiled element which can be fastened by riveting or by any other means. The element 5 has a lower base 53, on the opposite side to a free upper edge 52, via which the element 5 is secured to said panels of the forward edge 34.

The industrial impact associated with the installation of the element 5 is reduced since the precise positioning of said element can be modified after the definition of the pylon 3 without compromising the design of said pylon, for example during test flights within the framework of a certification process for the aircraft 1.

It should be noted that, in another embodiment, the element 5 is obtained by introducing a deformation of the fairing panels of the forward edge 34 of the pylon 3, for example when forming said panels.

The shape of the free upper edge 52 of the element 5 (or of each sub-element 54a, 54b, 54c, 54d) is advantageously such that it causes the least possible disturbance on the aerodynamic flow during flight at a low angle of attack while ensuring that vortices are generated during flight at a high angle of attack. A number of variants are represented in cross-sectional planes in FIGS. 5a, 5b, 5c and 5d, in a region of the forward edge 34 that contains the element 5 (or one of the sub-elements 54a, 54b, 54c, 54d).

Figure 5A:
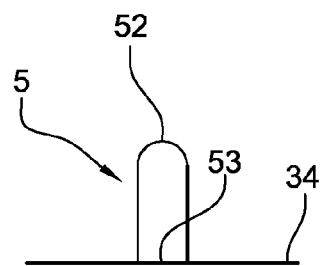
FIGS. 5a, 5b, 5c and 5d show partial schematic views of cross sections in transverse planes of various embodiments of a suspension pylon, in the region of a forward edge of said pylon.
Figure 5B:
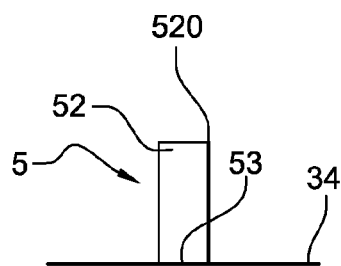

In a first category represented in FIGS. 5a and 5b, the width of the protruding element is substantially constant over the height of said element. The free upper edge 52 has a rounded shape in FIG. 5a, and a rectilinear shape substantially parallel to the forward edge 34 in FIG. 5b, forming a substantially rectangular cross section.

Figure 5C:
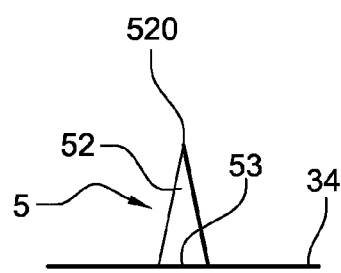
Figure 5D:
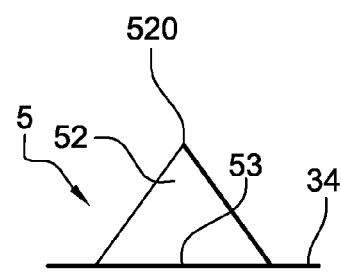

In a second category represented in FIGS. 5c and 5d, the width of the protruding element decreases with the height, forming a triangular cross section. The free upper edge 52 has an angle, preferably an acute angle, to initiate the formation of the vortices, forming a longitudinal arris 520 over the length of the element 5 (or of each sub-element 54a, 54b, 54c, 54d). FIGS. 5c and 5d correspond to elements having different widths at the lower base 53, the selection of which can be determined by the method used to fasten the protruding element to the forward edge 34.

The present disclosed embodiments also relate to an aircraft 1 as described above, which comprises at least one wing arrangement according to the aspects of the disclosed embodiments.

Therefore, the disclosed embodiments provide a wing arrangement comprising at least one pylon 3 having an element 5 for improving the aerodynamic behavior of the aircraft during flight at a high angle of attack when a deployed high-lift device produces a discontinuity in the leading edge 24. The element 5 generates negligible drag under cruise flight conditions and is exposed only to limited aerodynamic loads. In addition, the element 5 is preferably attached as an add-on to the pylon 3, for example fastened by riveting to the fairing panels forming the forward edge 34 of said pylon, thereby making it possible to optimize the position of the element 5 during test flights without compromising the design of the pylon.

What is claimed is:

1. A wing arrangement of an aircraft, comprising a wing and a pylon for suspending an engine below the wing, said wing having a leading edge provided with a high- lift device which is able to move between at least two positions, one being a deployed position in which said high-lift device projects forward of said leading edge in order to increase a lift coefficient of said wing during flight at a high angle of attack, said high-lift device being interrupted in a forward intermediate region of said wing that is situated at said leading edge, the pylon having a forward edge extending substantially forward of the leading edge of the wing between a forward upper portion connected to said wing in the forward intermediate region and a forward lower portion connected to a nacelle of the engine, wherein the pylon has, on the forward edge, a protruding element of narrow elongate shape that is oriented substantially in a longitudinal direction of said forward edge, such that during flight at a high angle of attack of the aircraft, the protruding element generates at least one vortex of the aerodynamic flow that is propagated toward the forward intermediate region above the wing; and the protruding element is arranged at the surface of the forward edge of the pylon substantially along an aerodynamic flow separation line which separates regions of the forward edge of the pylon in which stream lines of the aerodynamic flow propagate on opposite lateral flanks of the pylon during flight at a low angle of attack of the aircraft.

2. The wing arrangement as claimed in claim 1 wherein the protruding element has a free upper edge of rounded shape in a transverse plane.

3. The wing arrangement as claimed in claim 1 wherein the protruding element has a free upper edge which has at least one arris substantially in the longitudinal direction.

4. The wing arrangement as claimed in claim 1 wherein the protruding element has a lower base fastened to the forward edge of the pylon.

5. The wing arrangement as claimed in claim 1 wherein the protruding element is formed by fairing panels of the forward edge of the pylon.

6. The wing arrangement as claimed in claim 1 wherein the protruding element is continuous between an aft end of the pylon in the vicinity of the forward upper portion and a forward end of said pylon.

7. The wing arrangement as claimed in claim 1, wherein the protruding element is formed by a plurality of sub-elements which are aligned substantially in the longitudinal direction between an aft end of the pylon in the vicinity of the forward upper portion and a forward end of said pylon.

8. An aircraft comprising at least one wing arrangement as claimed in claim 1.

* * * * *